(12) United States Patent
Kimura (10) Patent No.: US 12,480,580 B2
(45) Date of Patent: Nov. 25, 2025

(54) SEAL CONNECTION BODY AND GASKET (71) Applicant: ISHIKAWA GASKET CO., LTD., Tokyo (JP)

(72) Inventor: Yukio Kimura, Tokyo (JP)

(73) Assignee: ISHIKAWA GASKET CO., LTD., Tokyo (JP)

( * ) Notice: Subject to any disclaimer, the term of this patent is extended or adjusted under 35 U.S.C. 154(b) by 0 days.

(21) Appl. No.: 18/832,618

(22) PCT Filed: Feb. 24, 2023

(86) PCT No.: PCT/JP2023/006793
§ 371 (c)(1),
(2) Date: Jul. 24, 2024

(87) PCT Pub. No.: WO2023/163118
PCT Pub. Date: Aug. 31, 2023

(65) Prior Publication Data
US 2025/0109793 A1 Apr. 3, 2025

(30) Foreign Application Priority Data
Feb. 24, 2022 (JP) .................. 2022-026545

(51) Int. Cl.
*F16J 15/02* (2006.01)
*F16J 15/10* (2006.01)
*F16J 15/12* (2006.01)

(52) U.S. Cl.
CPC ........... *F16J 15/022* (2013.01); *F16J 15/102* (2013.01); *F16J 15/121* (2013.01)

(58) Field of Classification Search
CPC .... F16J 15/0825; F16J 15/0818; F16J 15/121; F16J 15/102; F16J 15/022
See application file for complete search history.

(56) References Cited

U.S. PATENT DOCUMENTS 1,782,014 A * 11/1930 Rimmelspacher ..... F16J 15/121
277/653
3,738,670 A * 6/1973 Jelinek ................... F16J 15/121
49/482.1
(Continued)

FOREIGN PATENT DOCUMENTS

JP         02286859 A  *  4/1989
JP      2005-195091 A      7/2005
(Continued)

OTHER PUBLICATIONS

International Search Report Corresponding to International Application No. PCT/JP2023/006793 dated Apr. 18, 2023, 2 pages.
(Continued)

*Primary Examiner* — Eugene G Byrd
(74) *Attorney, Agent, or Firm* — Rankin, Hill & Clark LLP (57) ABSTRACT

A seal connection body includes an O-ring, a rubber ring in which an annular hole-forms part of a fluid flow path, and a connecting piece that connects the O-ring and the rubber ring by having one end joined to a part of an outer peripheral surface of the O-ring and the other end joined to a part of an outer peripheral surface of the rubber ring, and has a figure eight shape when viewed from above, and a wire diameter of the O-ring is thicker than a thickness of the connecting piece and upper and lower ends of the O-ring protrude from the connecting piece, and a thickness of the rubber ring is thicker than the thickness of the connecting piece and upper and lower ends of the rubber ring protrude from the connecting piece.

11 Claims, 4 Drawing Sheets

(56) References Cited

U.S. PATENT DOCUMENTS

| | | | | |
|---|---|---|---|---|
| 4,026,565 A * | 5/1977 | Jelinek | F16L 23/22 | 285/368 |
| 4,285,527 A * | 8/1981 | Connely | F16J 15/123 | 277/595 |
| 4,754,982 A * | 7/1988 | Udagawa | F16J 15/123 | 277/596 |
| 5,540,566 A * | 7/1996 | Ishizaki | F04B 49/225 | 417/300 |
| 5,607,167 A * | 3/1997 | Franckx | F16J 15/14 | 277/645 |
| 5,685,547 A * | 11/1997 | Jargeaix | F16J 15/064 | 277/598 |
| 5,803,462 A * | 9/1998 | Kozerski | F16J 15/0825 | 277/595 |
| 7,059,609 B1 * | 6/2006 | Locke | F16J 15/0825 | 29/888.3 |
| 2002/0063395 A1 * | 5/2002 | Klinner | F16J 15/0818 | 277/592 |
| 2002/0079651 A1 * | 6/2002 | Unseld | F16J 15/123 | 277/592 |
| 2005/0006857 A1 * | 1/2005 | Gernand | F16J 15/0825 | 277/628 |
| 2007/0262537 A1 * | 11/2007 | Klinner | F16J 15/0818 | 29/592 |
| 2012/0205877 A1 * | 8/2012 | Schumacher | A63B 21/023 | 277/650 |
| 2013/0038027 A1 * | 2/2013 | Feldner | F16J 15/121 | 277/591 |
| 2015/0260317 A1 | 9/2015 | Yamamoto et al. | | |
| 2016/0123467 A1 * | 5/2016 | Teranishi | F16J 15/022 | 277/608 |
| 2019/0162307 A1 * | 5/2019 | Kamm | F16J 15/0818 | |
| 2021/0095613 A1 * | 4/2021 | Kim | F02F 1/004 | |
| 2021/0108726 A1 * | 4/2021 | Makinae | F16J 15/127 | |
| 2025/0109793 A1 * | 4/2025 | Kimura | F16J 15/102 | |

FOREIGN PATENT DOCUMENTS

| | | | |
|---|---|---|---|
| JP | 2005214369 A | * | 8/2005 |
| JP | 6628214 B1 | | 1/2020 |
| WO | 2014/054561 A1 | | 4/2014 |

OTHER PUBLICATIONS

Written Opinion (ISA 237) Corresponding to International Application No. PCT/JP2023/006793 dated Apr. 18, 2023, 4 pages.

Japanese Office Action Corresponding to JP Application No. 2022-026545, dated Dec. 20, 2022, 6 pages.

Japanese Office Action Corresponding to JP Application No. 2022-026545, dated Mar. 7, 2023, 3 pages.

* cited by examiner

SEAL CONNECTION BODY AND GASKET

TECHNICAL FIELD

The present disclosure relates to a seal connection body and a gasket, and more particularly to a seal connection body that seals multiple holes with different uses and functions with one member, and a gasket incorporating the seal connection body.

BACKGROUND ART

As a vehicle engine becomes smaller, an installation space for water and oil flow paths formed in a gasket and a dowel hole is becoming narrower. Therefore, a gasket has been proposed in which a plurality of gasket members having an annular reinforcing ring around an axis and an annular elastic body portion around an axis formed of an elastic body attached to the reinforcing ring are provided, and an outer peripheral surfaces of a plurality of reinforcing rings are close to each other and a plurality of elastic body portions are connected (see Patent Literature 1). In the configuration disclosed in Patent Literature 1, by connecting the elastic body portions that seal flow paths, it is possible to assemble the gasket even when the space between a plurality of flow paths is narrow.

As the installation space becomes narrower, it is desired that a space between the dowel hole and the flow path also becomes narrower. However, even though they have a common feature of holes formed in the gasket, dowel holes and flow path holes have different uses and functions, and thus a required sealing performance is also different. Therefore, even when the configuration disclosed in Patent Literature 1 is applied to a gasket in which a dowel hole and a flow path are close to each other, there is still room for improvement in order to optimally seal each hole without impairing the use or function of each hole.

CITATION LIST

Patent Literature

Patent Literature 1: JP 6628214 B

SUMMARY OF INVENTION

Technical Problem

One of objects of the present disclosure is to provide a seal connection body and a gasket that optimally seal each hole without impairing use or function of each hole, even when multiple holes with different uses or functions are close to each other.

Solution to Problem

In one aspect of the present disclosure that achieves the above object, there is provided a seal connection body, where the seal connection body includes a squeeze packing having an annular shape, a ring having an annular shape in which an annular hole forms part of a fluid flow path, and a connecting piece that connects the squeeze packing and the ring by having one end joined to a part of an outer peripheral surface of the squeeze packing and the other end joined to a part of an outer peripheral surface of the ring, and has a figure eight shape when viewed from above, and a thickness of the squeeze packing is thicker than a thickness of the connecting piece and upper and lower ends of the squeeze packing protrude from the connecting piece, and a thickness of the ring is thicker than the thickness of the connecting piece and upper and lower ends of the ring protrude from the connecting piece.

In another aspect of the present disclosure, there is provided a gasket in which the seal connection body described above is incorporated.

Advantageous Effects of Invention

According to the present disclosure, by using a single member that connects seal members with different sealing performance with a connecting piece, even when holes with different uses and functions are in close proximity to each other, each hole can be optimally sealed without impairing use or function of each hole.

DESCRIPTION OF EMBODIMENTS

Hereinafter, seal connection body and gasket in one aspect of the present disclosure are described based on embodiments illustrated in drawings. In FIGS. 1 to 4, dimensions are changed to make it easier to understand a structure, and the dimensions do not necessarily correspond to proportions of what will actually be manufactured.

Figure 1:
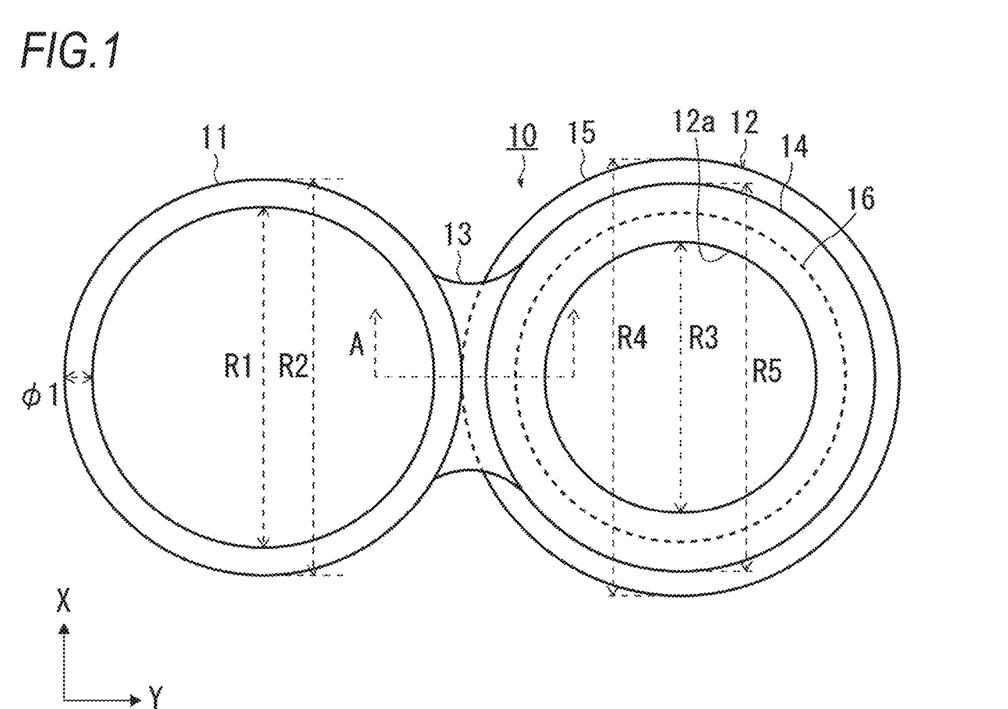
FIG. 1 is an explanatory diagram illustrating an embodiment of a seal connection body.

A seal connection body 10 illustrated in FIG. 1 is a seal connection body for a gasket to be incorporated into a gasket 1 to be described below. The seal connection body 10 includes an O-ring 11, a rubber ring 12, and a connecting piece 13, and the O-ring 11 and the rubber ring 12 are connected via the connecting piece 13. The seal connection body 10 has a "8" shape when viewed from above (viewed in a Z direction). The O-ring 11 corresponds to squeeze packing of the present disclosure, and the rubber ring 12 corresponds to a ring of the present disclosure.

The O-ring 11 has an annular axis oriented in the Z direction and forms an annular body (circular annular body) having a circular cross section, and a known O-ring can be used. The O-ring 11 is fitted into an O-ring groove formed at a peripheral edge end of a target hole. As a rubber forming the O-ring 11, known rubbers such as a nitrile rubber, a silicone rubber, and a fluororubber can be used.

The O-ring 11 is classified into an O-rings for movement that is compressed in a radial direction (for example, the Z direction) with a circular cross-section and an O-ring for fixing a cylindrical surface, and an O-ring for fixing a plane (flange) that is compressed in its radial direction and in a perpendicular direction (for example, a Y direction) perpendicular to the radial direction. In addition, the O-ring for fixing the plane is classified into an O-ring for internal pressure in which the perpendicular direction is from the inside to the outside in an annular radial direction, and an O-ring for external pressure in which the perpendicular direction is from the outside to the inside in the annular radial direction. Although the classification of the O-ring 11 is not particularly limited, for example, when incorporated into the gasket 1 described below, the O-ring 11 is an O-ring for internal pressure. Wire diameter ϕ1, inner diameter R1, outer diameter R2, and squeezing dimension of the O-ring 11 are each defined by the classification of the O-ring 11, the diameter of the target hole, and the shape and dimension of the O-ring groove to be fitted. The wire diameter ϕ1, inner diameter R1, outer diameter R2, and squeezing dimension of the O-ring 11 can be selected as appropriate.

As the rubber ring 12, a known rubber ring can be used in which an annular axis direction is oriented in the Z direction, the rubber ring forms an annular body having a polygonal cross section, and an annular hole 12a formed in a center of an annular body forms a part of a fluid flow path. When the annular hole 12a forms a part of the fluid flow path, it means that the rubber ring 12 is interposed in a middle of the flow path to make the flow path continuous, and an inner surface of the annular hole 12a does not need to be in constant contact with the fluid. The rubber ring 12 is located on an outer side of the O-ring 11 in the annular radial direction. The rubber ring 12 is fitted into a ring groove formed at the peripheral edge end of the target hole.

Specifically, the rubber ring 12 has a ring portion 14 and a plate portion 15. In the rubber ring 12, an outer peripheral portion of the plate portion 15 is fitted into a ring groove formed at a peripheral edge end of a target hole, and the ring portion 14 is placed in the target hole. The upper and lower ends of the ring portion 14 are in direct contact with piping or the like forming a fluid flow path. Inner diameter R3 and outer diameter R4 of the rubber ring 12, and an outer diameter R5 of the ring portion 14 are each defined by a desired flow path area of the fluid flow path, a hole diameter of the target hole, and shape and dimension of the ring groove to be fitted. The inner diameter R3 and outer diameter R4 of the rubber ring 12, and the outer diameter R5 of the ring portion 14 can be selected as appropriate.

The ring portion 14 has an annular axis direction oriented in the Z direction, and forma an annular body having a polygonal cross section. As a rubber forming the ring portion 14, a known rubber can be used similarly to the O-ring 11. In the ring portion 14, a recess 16 is formed in a middle of an outer circumferential surface in the annular axis direction, and is recessed from an outer side to an inner side in the annular radial direction over the entirety of an annular circumferential direction.

The plate portion 15 has an annular axis oriented in the Z direction and forms an annular body having a rectangular cross section. The plate portion 15 may be made of a rubber similarly to the ring portion 14. When the ring portion 14 and the plate portion 15 are each made of the same rubber, the ring portion 14 and the plate portion 15 have an integrated structure, which has the advantage that the rubber ring 12 can be manufactured easily. On the other hand, it is desirable that the plate portion 15 be made of metal or an alloy. Since the plate portion 15 is made of metal or alloy, deformation of the plate portion 15 is reduced. As a result, it becomes possible to effectively prevent the rubber ring 12 from falling off. As the metal or alloy that forms the plate portion 15, known metals or alloys such as stainless steel, copper, or aluminum can be used. The plate portion 15 has an inner circumferential portion fitted into the recess 16 of the ring portion 14 and an outer circumferential portion protruding outward from an outer circumferential surface of the ring portion 14.

One end of the connecting piece 13 in the Y direction is joined to a part of an outer peripheral surface of the O-ring 11, and the other end is joined to a part of an outer peripheral surface of the ring portion 14, thereby connecting the O-ring 11 and the rubber ring 12. As a rubber forming the connecting piece 13, a known rubber can be used as in the case of the O-ring 11. The connecting piece 13 can connect the O-ring 11 and the rubber ring 12 and can be deformed as appropriate in a range that does not impede sealing functions of the O-ring 11 and the rubber ring 12.

Specifically, the connecting piece 13 is located between the O-ring 11 and the ring portion 14 of the rubber ring 12. The connecting piece 13 includes a part of the outer peripheral portion of the plate portion 15 of the rubber ring 12 therein. More specifically, the connecting piece 13 covers each of upper and lower end surfaces of a part of the outer peripheral portion of the plate portion 15. Examples of joining the connecting piece 13 to the O-ring 11 and the rubber ring 12 include welding, deposition, adhesion, and brazing.

Figure 2:
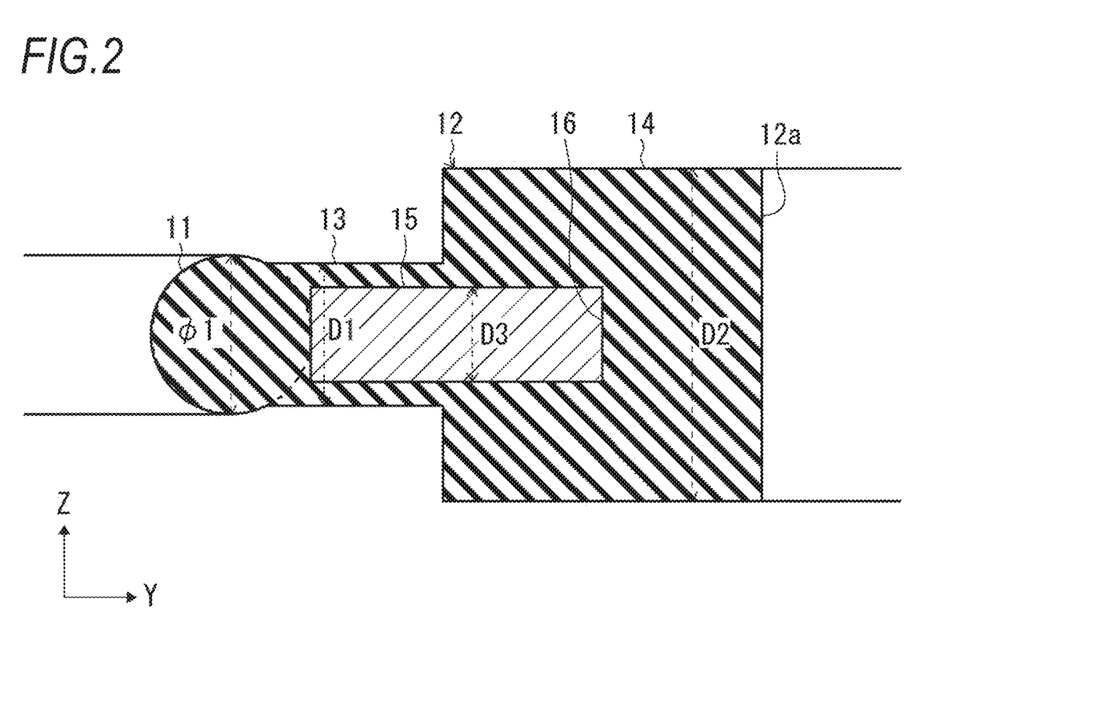
FIG. 2 is a cross-sectional view of the seal connection body viewed from a direction indicated by an arrow A in FIG. 1.

FIG. 2 shows a cross section of a connecting portion between the O-ring 11 and the rubber ring 12. When a thickness D1 of the connecting piece 13 in the Z direction is thicker than the wire diameter ϕ (the thickness of the O-ring 11 in the Z direction) of the O-ring 11 or a thickness D2 of the ring portion 14 of the rubber ring 12 in the Z direction, sealing functions of the O-ring 11 and rubber ring 12 is inhibited. Therefore, the wire diameter ϕ1 of the O-ring 11 is thicker than the thickness D1 of the connecting piece 13. An upper end of the O-ring 11 in the Z direction protrudes upward from an upper end of the connecting piece 13, and a lower end of the O-ring 11 in the Z direction protrudes downward from a lower end of the connecting piece 13. Further, the thickness D2 of the ring portion 14 is thicker than the thickness D1 of the connecting piece 13. An upper end of the ring portion 14 in the Z direction protrudes upward from the upper end of the connecting piece 13, and a lower end of the ring portion 14 in the Z direction protrudes downward from the lower end of the connecting piece 13. In addition, a thickness D3 of the plate portion 15 of the rubber ring 12 is thinner than each of the wire diameter ϕ1 of the O-ring 11 and the thickness D1 of the connecting piece 13.

It is desirable that the types of rubbers forming each of the O-ring 11, the ring portion 14 of the rubber ring 12, and the connecting piece 13 are the same. When the types of rubbers are the same, each of the O-ring 11, ring portion 14, and connecting piece 13 will be integrated, and the integration will be advantageous in improving durability of the respective joint parts. An example of a manufacturing method for realizing integration is a method of joining, after arranging the separately manufactured O-ring 11 and rubber ring 12, the same type of rubbers as that forming the O-ring 11 and the ring portion 14 using a known welding method such as hot air welding, thermal welding, or ultrasonic welding.

As described above, according to the present embodiment, the seal connection body 10 which is a single member in which the O-ring 11 and the rubber ring 12 having different sealing performances are connected by the connecting piece 13 allows each hole to be optimally sealed without impairing use or function of each hole, even when holes with different uses or functions are close to each other.

The seal connection body 10 can adjust a length between the O-ring 11 and the rubber ring 12 by adjusting a length of the connecting piece 13 in the Y direction. The seal connection body 10 is capable of bringing the O-ring 11 and the rubber ring 12 closer together until an outer circumferential surface of the O-ring 11 and an outer circumferential surface of the plate portion 15 of the rubber ring 12 come into contact.

Figure 3:
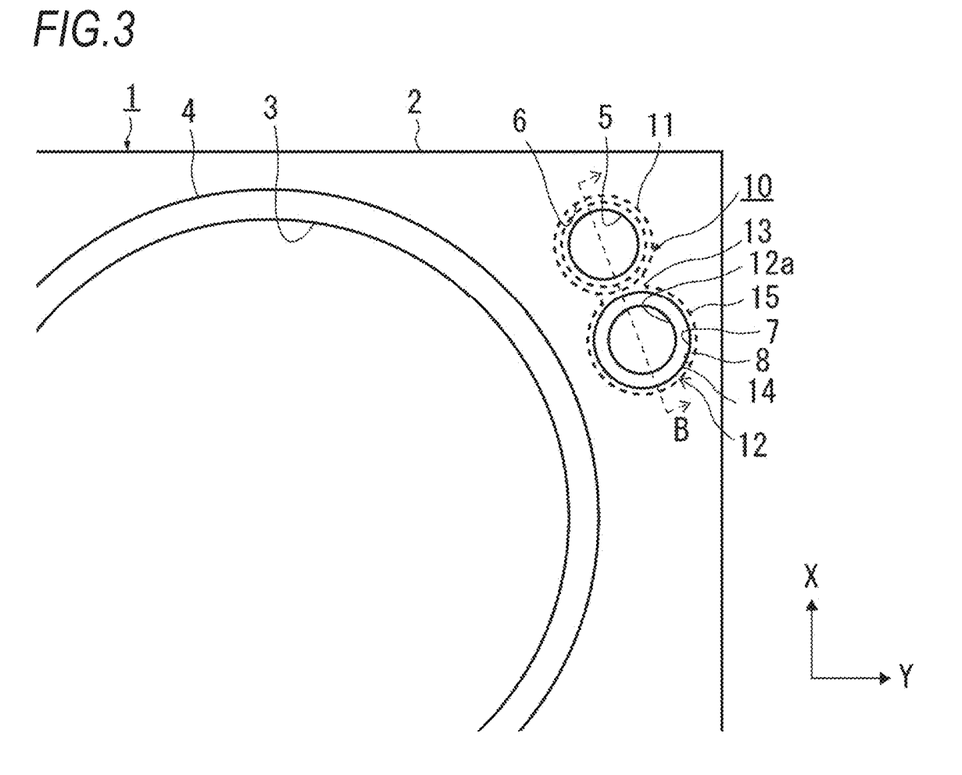
FIG. 3 is an explanatory diagram illustrating an embodiment of a gasket.

The gasket 1 illustrated in FIG. 3 is a cylinder head gasket for an engine that is interposed between a cylinder block and a cylinder head of a known engine. The gasket 1 is made up of three or more metal plates 2 stacked together, and includes a cylinder bore 3, a bore seal 4, a fastening hole 5, an O-ring groove 6, a flow path hole 7, a ring groove 8, and the seal connection body 10. The gasket 1 includes a large number of cylinder bores, bore seals, fastening holes, O-ring grooves, flow path holes, and ring grooves (not illustrated).

Each of the metal plates 2 is stacked in the Z direction. As the metal or alloy that forms the metal plate 2, known metals or alloys such as stainless steel, copper, or aluminum can be used. When three or more metal plates 2 are stacked, in the peripheral edge end of a given hole, it becomes possible to easily form a groove having a "U"-shaped cross section by making hole diameters of holes formed in the metal plates 2 in the middle part smaller than hole diameters of holes formed in an uppermost metal plate 2 and a lowermost metal plate 2. The metal plates 2 may be made of different metals or alloys. The number of stacked metal plates 2 in the gasket 1 is preferably three or more and six or less.

The cylinder bore 3 communicates with a cylinder bore formed in the cylinder block. The bore seal 4 surrounds the cylinder bore 3 and functions as a seal for the cylinder bore 3. Examples of the bore seal 4 include a bead formed by bending the metal plate 2, a folded back part, and a grommet attached to an end.

The fastening hole 5 is a hole used when the gasket 1 is fastened. Examples of the fastening hole 5 include a dowel hole into which a dowel pin required for positioning the gasket 1 when fastening is inserted, and a bolt hole into which a bolt for fastening the gasket 1 between the cylinder block and the cylinder head is inserted. Two dowel holes may be formed in the gasket 1. The number of bolt holes should correspond to the number of cylinder bores 3 formed in the gasket 1.

The O-ring groove 6 surrounds the fastening hole 5. By fitting the O-ring 11 into the O-ring groove 6, it is possible to prevent fluid passing through the fastening hole 5 from penetrating between layers of the metal plates 2. The fluid passing through the fastening hole 5 is not particularly limited. For example, in an overhead valve engine that opens and closes a valve provided above a cylinder head by pushing up a rocker arm via a push rod, the fluid is oil collected at the top of the cylinder head.

The flow path hole 7 is a hole for connecting a fluid flow path. Examples of the fluid include engine lubricating oil and cooling water. The flow path hole 7 is wider than the fluid flow path. The ring groove 8 surrounds the flow path hole 7. By fitting the rubber ring 12 into the ring groove 8, the part where the fluid flow path is interrupted by the gasket 1 becomes continuous with the rubber ring 12, and by being sealed by the rubber ring 12, it is possible to prevent fluid from leaking from the flow path.

In the figure, the fastening hole 5 and the flow path hole 7 are close to each other, and the seal connection body 10 is used as a member to seal them. Unless fastening holes and flow path holes (not illustrated) are close to each other, only an O-ring of the same type as the O-ring 11 is fitted into the O-ring groove surrounding the fastening hole, and only a rubber ring of the same type as the rubber ring 12 is fitted into the ring groove surrounding the flow path hole.

Figure 4:
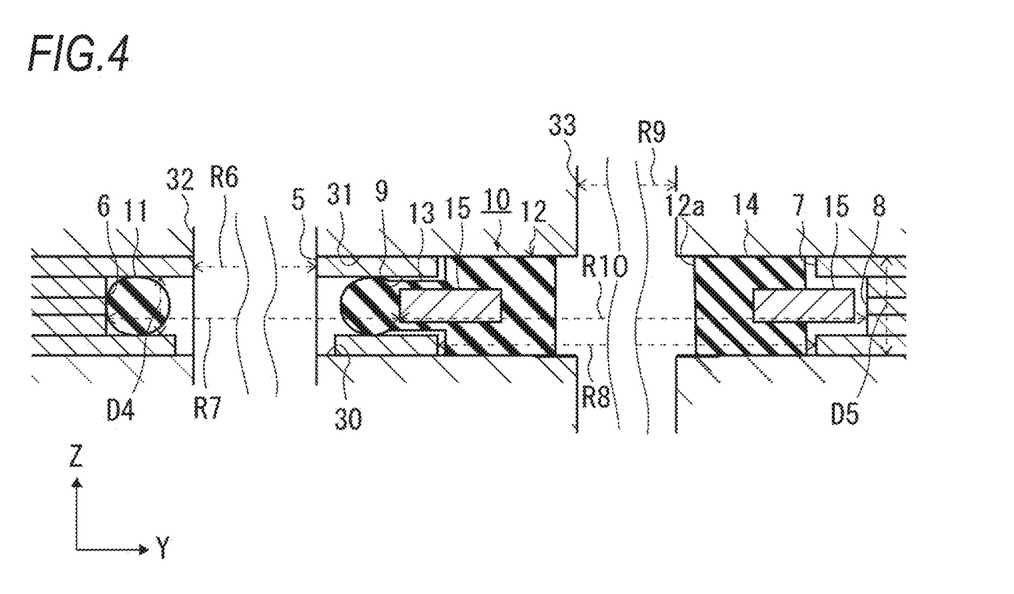
FIG. 4 is a cross-sectional view of the gasket viewed from a direction indicated by an arrow B in FIG. 3.

FIG. 4 illustrates an example of a cross section of the gasket 1 in which the seal connection body 10 is incorporated, which is interposed between a cylinder block 30 and a cylinder head 31. The gasket 1 is formed by stacking five metal plates 2, a dowel pin 32 is inserted into the fastening hole 5, and a fluid flow path 33 is connected to the flow path hole 7. In the seal connection body 10, the O-ring 11 is fitted into the O-ring groove 6, and the plate portion 15 of the rubber ring 12 is fitted into the ring groove 8.

The fastening hole 5 is set so that a hole diameter R6 of a hole formed in the uppermost metal plate 2 falls in a predetermined tolerance based on a pin diameter of the dowel pin 32. In the fastening hole 5, a hole formed in the lowest metal plate 2 may also be set to have a hole diameter of R6, similar to the hole formed in the lowest metal plate 2.

The O-ring groove 6 is formed at the peripheral edge end of the fastening hole 5. The O-ring groove 6 is recessed in a "U" shape from the inside of the fastening hole 5 in the radial direction to the outside. Specifically, the O-ring groove 6 is formed by forming holes with a wider diameter than the holes formed in the uppermost and lowermost metal plates 2 in the three metal plates 2 in the middle excluding the uppermost and lowermost metal plates 2.

The O-ring 11 is fitted into the O-ring groove 6 and functions as a plane-fixed internal pressure O-ring. Specifically, the wire diameter $\phi 1$ of the O-ring 11 is thicker than a width D4 of the O-ring groove 6 in the Z direction. The outer diameter R2 of the O-ring 11 is longer than an outer diameter R7 of the O-ring groove 6. Therefore, the O-ring 11 is compressed in the Z direction by the uppermost and lowermost metal plates 2, and is compressed in the Y direction by internal pressure in a direction from the inside to the outside of the fastening hole 5 in the radial direction due to the fluid passing through the fastening hole 5. As a result, a space between the layers of the metal plates 2 is sealed by the O-ring 11, and fluid passing through the fastening hole 5 can be prevented from entering between the layers. Further, the inner diameter R1 of the O-ring 11 is longer than the hole diameter R6 of the fastening hole 5. Therefore, the O-ring 11 does not come into contact with the dowel pin 32 inserted into the fastening hole 5. Thereby, even when the O-ring 11 is provided, a hole size for inserting the dowel pin 32, which serves as a reference for the cylinder block 30 and the cylinder head 31, can be maintained.

In the flow path hole 7, a hole diameter R8 of each hole formed in the uppermost and lowermost metal plates 2 is longer than a flow path diameter R9 of the flow path 33 formed in the cylinder block 30 and the cylinder head 31. Specifically, the hole diameter R8 is longer than the outer diameter R5 of the ring portion 14 of the rubber ring 12.

The ring groove 8 is formed at the peripheral edge end of the flow path hole 7. The ring groove 8 is recessed in a "U" shape from the inside to the outside of the flow path hole 7 in the radial direction. Specifically, the ring groove 8 is formed by forming holes with a wider diameter than the holes formed in the uppermost and lowermost metal plates 2 in the three metal plates 2 in the middle, excluding the uppermost and lowermost metal plates 2.

The hole diameter R3 of the annular hole 12a of the ring portion 14 is longer than the flow path diameter R9 of the flow path 33. The outer diameter R4 of the plate portion 15 is shorter than an outer diameter R10 of the ring groove 8. The outer diameter R5 of the ring portion 14 is shorter than the hole diameter R8 of the flow path hole 7. Therefore, the plate portion 15 is fitted into the ring groove 8 and the ring portion 14 is placed in the flow path hole 7. As a result, the annular hole 12a functions as a part of the flow path 33. Further, the thickness D2 of the ring portion 14 is equal to or greater than a depth in a hole axial direction of the flow path hole 7, that is, a thickness D5 of the gasket 1. Therefore, the upper end of the ring portion 14 is directly in contact with a lower end of the flow path 33 formed in the cylinder head 31, and the lower end of the ring portion 14 is directly in contact with an upper end of the flow path 33 formed in the cylinder block 30, so that the ring portion 14 is compressed in an up-down direction. As a result, parts of the flow path 33 that are interrupted by the gasket 1 are connected by the rubber ring 12, so that the flow path 33 is continuous without any break. Further, the compressed ring portion 14 can prevent fluid from leaking from the flow path 33 and entering between the layers of the metal plates 2.

Due to the fastening hole 5 and the flow path hole 7 being close to each other, part of the O-ring groove 6 and part of the ring groove 8 are merged to form a communication hole 9 that communicates the fastening hole 5 and the flow path hole 7. The communication hole 9 is formed by stacking only the uppermost and lowermost metal plates 2 without the three intermediate metal plates 2. The communication hole 9 has the same shape as the connecting piece 13 in plan view. The connecting piece 13 is placed in the communication hole 9 when the seal connection body 10 is assembled into the gasket 1. The communication hole 9 is closed by the O-ring 11 and the rubber ring 12.

As described above, according to the present embodiment, even when the fastening hole 5 and the flow path hole 7 are close to each other, by using the seal connection body 10, the O-ring 11 seals the fastening hole 5 and the rubber ring 12 seals the flow path hole 7. As a result, in the fastening hole 5, it becomes possible to seal between the layers of the plurality of metal plates 2 while having a configuration in which the hole diameter R6 of the fastening hole 5 is secured by the sealing by the O-ring 11. Further, in the flow path hole 7, the sealing by the rubber ring 12 makes it possible to more reliably prevent fluid from leaking from the flow path 33.

the present embodiment has a configuration that reduces the number of parts and assembly man-hours, and avoids the risk of assembly defects by sealing a plurality of holes with different uses and functions with one member, and also even when holes with different uses and functions are located close to each other, it is possible to optimally seal each hole without impairing use or function of each hole.

The seal connection body 10 is capable of bringing the O-ring 11 and the rubber ring 12 closer together until the outer circumferential surface of the O-ring 11 and the outer circumferential surface of the plate portion 15 of the rubber ring 12 come into contact. That is, in the gasket 1, the fastening hole 5 and the flow path hole 7 can be brought close to each other until the outer circumferential surface of the O-ring 11 and the outer circumferential surface of the plate portion 15 of the rubber ring 12 come into contact. This is advantageous in dealing with narrowing of installation space.

Although the embodiment of the present disclosure is described above, the seal connection body and gasket of the present disclosure are not limited to a specific embodiment, and various modifications and changes can be made within the scope of the gist of the present disclosure.

The squeeze packing of the present disclosure is not limited to the O-ring 11, and any known squeeze packing such as an X-ring, D-ring, or T-ring can be used. Also, the squeeze packing may be made of a material other than rubber, as long as it can be sealed by its own elasticity when it is fitted into a target O-ring groove and crushed, and a known metal hollow O-ring may also be used.

The ring of the present disclosure is not limited to the rubber ring 12 having the ring portion 14 and the plate portion 15, but a rubber ring having only a ring portion as in Patent Literature 1 (Japanese Patent No. 6628214) can be used. For a rubber ring that only has a ring portion, the ring portion is fitted into the target ring groove. In this case, a wire diameter of the O-ring and a thickness of the ring portion are equal. The ring may be made of a material other than rubber, and a known metal ring may also be used.

The O-ring 11 may have a backup ring. When the O-ring 11 of the seal connection body 10 incorporated in the gasket 1 has a backup ring, the backup ring is preferably placed outside the O-ring 11.

The gasket of the present disclosure is not limited to a cylinder head gasket, but may be any gasket that is formed by stacking three or more metal plates 2 and in which the fastening hole 5 and the flow path hole 7 are formed. For example, a gasket for a water-cooled motor.

Although a dowel hole and a bolt hole are illustrated as the fastening hole 5, fastening stress due to an action of a bolt axial force is concentrated around the bolt hole. Therefore, bolt holes are often not placed close to other holes such as cylinder bores or flow path holes. Therefore, a dowel hole is more suitable as the fastening hole 5 than a bolt hole.

Here, the features of the seal connection body and gasket according to the present embodiment described above are briefly summarized and listed below in [1] to [9].

[1] A seal connection body (10), where
the seal connection body (10) includes a squeeze packing (O-ring 11) having an annular shape, a ring (rubber ring 12) having an annular shape in which an annular hole (12a) forms part of a fluid flow path, and a connecting piece (13) that connects the squeeze packing (O)-ring 11) and the ring (rubber ring 12) by having one end joined to a part of an outer peripheral surface of the squeeze packing (O-ring 11) and the other end joined to a part of an outer peripheral surface of the ring (rubber ring 12), and has a figure eight shape when viewed from above, and
a thickness of the squeeze packing (O-ring 11) is thicker than a thickness of the connecting piece (13) and upper and lower ends of the squeeze packing (O-ring 11) protrude from the connecting piece (13), and a thickness of the ring (rubber ring 12) is thicker than the thickness of the connecting piece (13) and upper and lower ends of the ring (rubber ring 12) protrude from the connecting piece (13).

[2] The seal connection body (10) according to [1], where
the squeeze packing is an O-ring (11) made of rubber,
the ring (rubber ring 12)7 has a ring portion (14) in which the annular bole (12a) is formed and a plate portion (15) protruding outward from an outer peripheral surface of the ring portion (14) to form an annular shape,
at least the ring portion (14) of the ring portion (14) and the plate portion (1%) is made of rubber, a thickness of the ring portion (14) is thicker than a wire diameter of the O-ring (11), upper and lower ends of the ring portion (14) protrude from the connecting piece (13), and a thickness of the plate portion (1%) is thinner than a thickness of the connecting piece (13), and
the connecting piece (13) is made of rubber, the other end is joined to a part of the outer peripheral surface of the ring portion (14), and a part of the plate portion (15) is contained in the connecting piece.

[3] The seal connection body (10) according to [2], where the plate portion (15) is made of metal.

[4] The seal connection body (10) according to [2] or [3], where types of rubber forming the O-ring (11), the ring portion (14), and the connecting piece (13) are the same.

[5] A gasket (1) in which the seal connection body (10) according to any one of [1] to [4] is incorporated.

[6] A gasket (1) in which the seal connection body (10) according to any one of [2] to [4] is incorporated, where the gasket (1) is made up of three or more metal plates (2) stacked, and has a fastening hole (5) into which a dowel pin or bolt is inserted, and a flow path hole (7) that is wider than a fluid flow path, the O-ring (11) is fitted into an O-ring groove (6) formed at a peripheral edge end of the fastening hole (5) and recessed from inside to outside in a radial direction of the fastening hole (5), and the plate portion (15) of the ring (rubber ring 12) is fitted into a ring groove (8) formed at a peripheral edge end of the flow path hole (7) and recessed from inside to outside in a radial direction of the flow path hole (7), and the ring portion (14) of which a thickness in a ring axial direction is equal to or greater than a depth of the flow path hole (7) in a hole axial direction is located in the flow path hole (7).

[7] The gasket (1) according to [6], where the fastening hole (5) and the flow path hole (7) are brought close to each other until an outer periphery of the O-ring (11) and an outer periphery of the plate portion (15) come into contact.

[8] The gasket (1) according to [6] or [7], where an inner circumference of the O-ring (11) is not in contact with the dowel pin or bolt inserted into the fastening hole (5).

[9] The gasket (1) according to any one of [6] to [8], where the connecting piece (1 #) is located in a communicating part between the fastening hole (5) and the flow path hole (7), which is formed by merging a part of the O-ring groove (6) and a part of the ring groove (8).

Although the present disclosure is described in detail with reference to a specific embodiment, it will be apparent to those skilled in the art that various changes and modifications can be made without departing from the spirit and scope of the present disclosure.

This application is based on a Japanese patent application (Japanese Patent Application No. 2022-026545) filed on Feb. 24, 2022, the contents of which are incorporated by reference into this application.

INDUSTRIAL APPLICABILITY

The seal connection body and gasket of the present disclosure can optimally seal each hole without impairing use or function of each hole, even when holes with different uses or functions are close to each other. The present disclosure that achieves this effect is useful for a seal connection body and a gasket.

REFERENCE SIGNS LIST

1: gasket
2: metal plate
5: fastening hole
6: O-ring groove
7: flow path hole
8: ring groove
10: seal connection body
11: O-ring
12: rubber ring
12a: annular hole
13: connecting piece
14: ring portion
15: plate portion

The invention claimed is:

1. A seal connection body comprising:
a squeeze packing having an annular shape;
a ring having an annular shape and having an annular hole which forms a part of a fluid flow path; and
a connecting piece that connects the squeeze packing and the ring by having one end joined to a part of an outer peripheral surface of the squeeze packing and the other end joined to a part of an outer peripheral surface of the ring,
wherein the seal connection body has a figure eight shape when viewed from above,
wherein a thickness of the squeeze packing is thicker than a thickness of the connecting piece,
wherein upper and lower ends of the squeeze packing protrude from the connecting piece,
wherein a thickness of the ring is thicker than the thickness of the connecting piece,
wherein upper and lower ends of the ring protrude from the connecting piece,
wherein the squeeze packing is an O-ring made of rubber,
wherein the ring has a ring portion in which the annular hole is formed and a plate portion protruding outward from an outer peripheral surface of the ring portion to form an annular shape, at least the ring portion of the ring portion and the plate portion being made of rubber,
wherein a thickness of the ring portion is thicker than a wire diameter of the O-ring,
wherein upper and lower ends of the ring portion protrude from the connecting piece,
wherein a thickness of the plate portion is thinner than a thickness of the connecting piece, and
wherein the connecting piece is made of rubber.

2. The seal connection body according to claim 1,
wherein the other end of the connecting piece is joined to a part of the outer peripheral surface of the ring portion, and
wherein a part of the plate portion is contained in the connecting piece.

3. The seal connection body according to claim 2,
wherein the plate portion is made of metal.

4. The seal connection body according to claim 2,
wherein types of rubber forming the O-ring, the ring portion, and the connecting piece are the same.

5. A gasket in which the seal connection body according to claim 1 is incorporated.

6. A gasket in which the seal connection body according to claim 2 is incorporated,
wherein the gasket includes three or more metal plates being stacked on one another, a fastening hole into which a dowel pin or bolt is inserted, and a flow path hole that is wider than the fluid flow path,
wherein the O-ring is fitted into an O-ring groove formed at a peripheral edge end of the fastening hole and recessed from inside to outside in a radial direction of the fastening hole,
wherein the plate portion of the ring is fitted into a ring groove formed at a peripheral edge end of the flow path hole and recessed from inside to outside in a radial direction of the flow path hole, and wherein the ring portion having a thickness in a ring axial direction being equal to or greater than a depth of the flow path hole in a hole axial direction is located inside the flow path hole.

7. The gasket according to claim 6,
wherein the fastening hole and the flow path hole are closely adjacent to each other to allow an outer periphery of the O-ring contacts with an outer periphery of the plate portion.

8. The gasket according to claim 6,
wherein an inner circumference of the O-ring is not in contact with the dowel pin or bolt inserted into the fastening hole.

9. The gasket according to claim 6,
wherein the connecting piece is located in a communicating part between the fastening hole and the flow path hole, which is formed by merging a part of the O-ring groove and a part of the ring groove.

10. The seal connection body according to claim 1,
wherein the plate portion is made of metal.

11. The seal connection body according to claim 1,
wherein types of rubber forming the O-ring, the ring portion, and the connecting piece are the same.

* * * * *